UNITED STATES PATENT OFFICE.

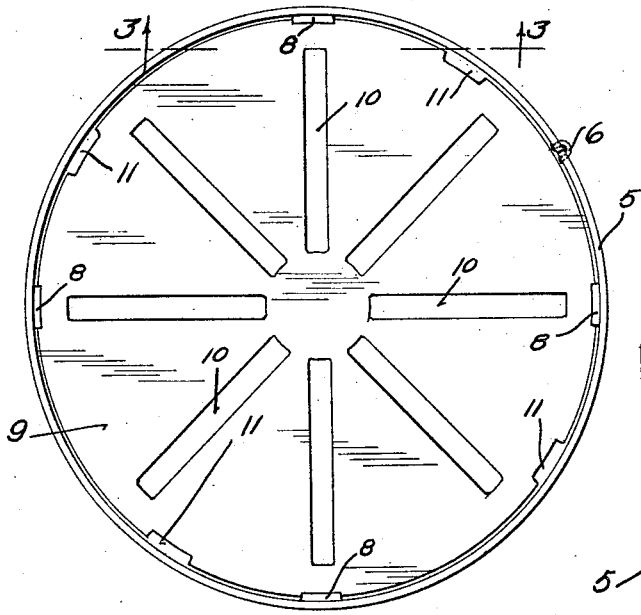
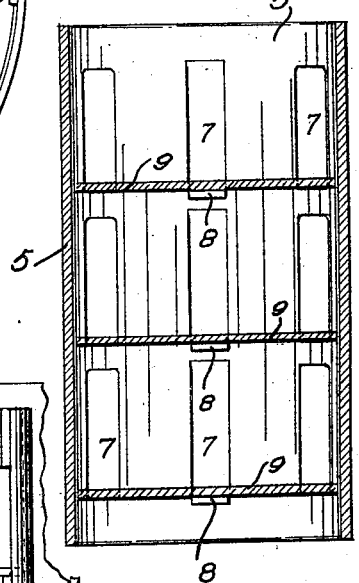
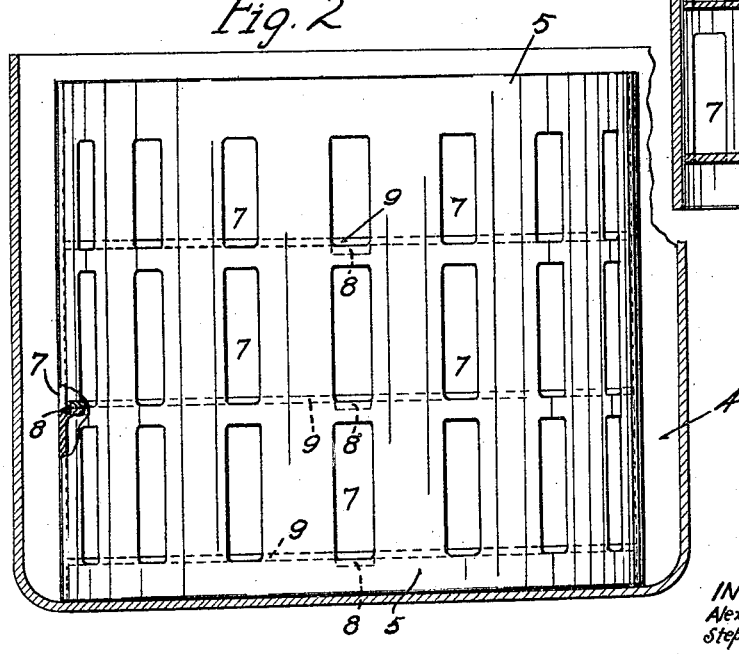

ALEXANDER LE DUC AND STEPHEN LE DUC, OF MINNEAPOLIS, MINNESOTA.

BASKET FOR COOKING UTENSILS.

1,413,744.  Specification of Letters Patent.  Patented Apr. 25, 1922.

Application filed August 5, 1920. Serial No. 401,233.

*To all whom it may concern:*

Be it known that we, ALEXANDER LE DUC and STEPHEN LE DUC, citizens of the United States, residing at Minneapolis, in the county of Hennepin and State of Minnesota, have invented certain new and useful Improvements in Baskets for Cooking Utensils; and we do hereby declare the following to be a full, clear, and exact description of the invention, such as will enable others skilled in the art to which it appertains to make and use the same.

Our invention relates to cooking utensils and is directed to the provision of an improved basket or inner cage that is insertable into a cooking vessel, such as a pot or kettle and is adapted to contain various different vegetables or other edibles that are to be cooked.

Generally stated the invention consists of the novel devices and combinations of devices hereinafter described and defined in the claims.

In the accompanying drawings which illustrate the invention, like characters indicate like parts throughout the several views.

Referring to the drawings:

Fig. 1 is a plan view of the basket or cage removed from working position;

Fig. 2 shows the basket in side elevation and a kettle or like cooking vessel in which the basket is inserted, in vertical section; and Fig. 3 is a vertical section on the line 3—3 of Fig. 1.

The cooking vessel, which is preferably a pot or kettle 4, may be any suitable construction, such as found in use, but will preferably be provided with a cover which is not shown. The basket is preferably made from a single piece of sheet metal bent to form a cylinder 5 and having its abutting edges secured together by clinched staples 6 or any other suitable means.

In its sides, the metal cylinder 5 is provided with punched-out openings 7, which permit the free circulation of the water through the cylinder. These openings 7 are arranged in a plurality of vertically spaced circumferentially extended horizontal rows, and as shown, there are three such rows. Certain of the passages 7 of each row at their extremities are provided with inwardly projecting rest lugs 8 preferably formed by turning inward integral portions of the cylinder forming sheet. As shown, there are four rest lugs 8 for each horizontal row of openings 7, and these lugs, as shown, are located 90 degrees apart.

The cylindrical basket is provided with a plurality of displaceable and interchangeably usable false bottoms, preferably all made alike, each being formed from a disk-like metal plate 9 having radially extended passages 10 and peripheral notches 11. The notches 11 of each bottom disk are located 90 degrees apart and are of such size that when aligned with the rest lug 8, they will clear and pass the same, so that a false bottom may be dropped down within the cage to a position immediately above any horizontal series of lugs 8. The false bottom is then rotated so as to turn its notches out of line with the underlying lugs, and will then be supported by said lugs. Of course, the removal of the false bottom will be accomplished by reverse operation.

From the foregoing, it will be understood that one or more of the false bottoms may be thus applied in working position and placed on any one of the horizontal series of rest lugs and thus supported in any one of several different vertical positions in respect to the bottom of the cage and in respect to the bottom of the cooking vessel. Also, it is evident that any two or more of false bottoms may be thus applied in different vertical positions, within the basket or cage. This makes it possible to boil several different kinds of vegetables at one time, or vegetables and eggs, or the like, may be boiled at the same time, without permitting the several different articles to become mixed together. Also when the articles are cooked and the basket is lifted from the cooking vessel, the cooked articles will be drained by the act of removing the cage from the water.

What we claim is:

1. A basket for use for cooking vessels, comprising a cylindrical shell having openings in its wall, and a plurality of vertically adjustable interchangeably usable false bottoms, said false bottoms having openings therein, said shell and bottoms being constructed and arranged so that said bottoms can be inserted from the top of the shell and seated at different points along said shell.

2. A basket for use in cooking vessels, comprising a cylindrical shell formed from sheet metal, having openings cut in its wall and provided with inwardly projecting circumferentially spaced rest lugs, and a disk-like metallic false bottom removably seated on said rest lugs and insertable from the top of the shell and itself provided with openings for the circulation of water therethrough.

3. A basket for use in cooking vessels, comprising a cylindrical shell formed from sheet metal, provided with a plurality of vertically spaced circumferentially extended horizontal rows of openings and provided with several vertically spaced horizontal series of circumferentially spaced inwardly projecting rest lugs, and a plurality of disk-like false bottoms having openings therein for the circulation of water therethrough and provided with circumferentially spaced peripheral notches adapted to clear said rest lugs only when in registration therewith.

4. A basket for use in cooking vessels, comprising a cylindrical shell formed from sheet metal, provided with a plurality of vertically spaced circumferentially extended horizontal rows of openings and provided with several vertically spaced horizontal series of circumferentially spaced inwardly projecting rest lugs, and a plurality of disk-like false bottoms having openings therein for the circulation of water therethrough and provided with circumferentially spaced peripheral notches adapted to clear said rest lugs only when in registration therewith, said rest lugs being formed by turning inward portions of said cylindrical shell, at the extremities of certain of the openings thereof.

In testimony whereof we affix our signatures.

ALEXANDER LE DUC.
STEPHEN LE DUC.